(No Model.) 2 Sheets—Sheet 1.

H. PETTIBONE & B. LOOMIS, Jr.
DOMESTIC WATER AND STEAM HEATER.

No. 547,128. Patented Oct. 1, 1895.

Witnesses
Martha Culley
C. H. Thompson

Inventors
Hawley Pettibone
Burdett Loomis Jr.
By E. H. Clark
Attorney (No Model.) 2 Sheets—Sheet 2.
H. PETTIBONE & B. LOOMIS, Jr.
DOMESTIC WATER AND STEAM HEATER.
No. 547,128. Patented Oct. 1, 1895.
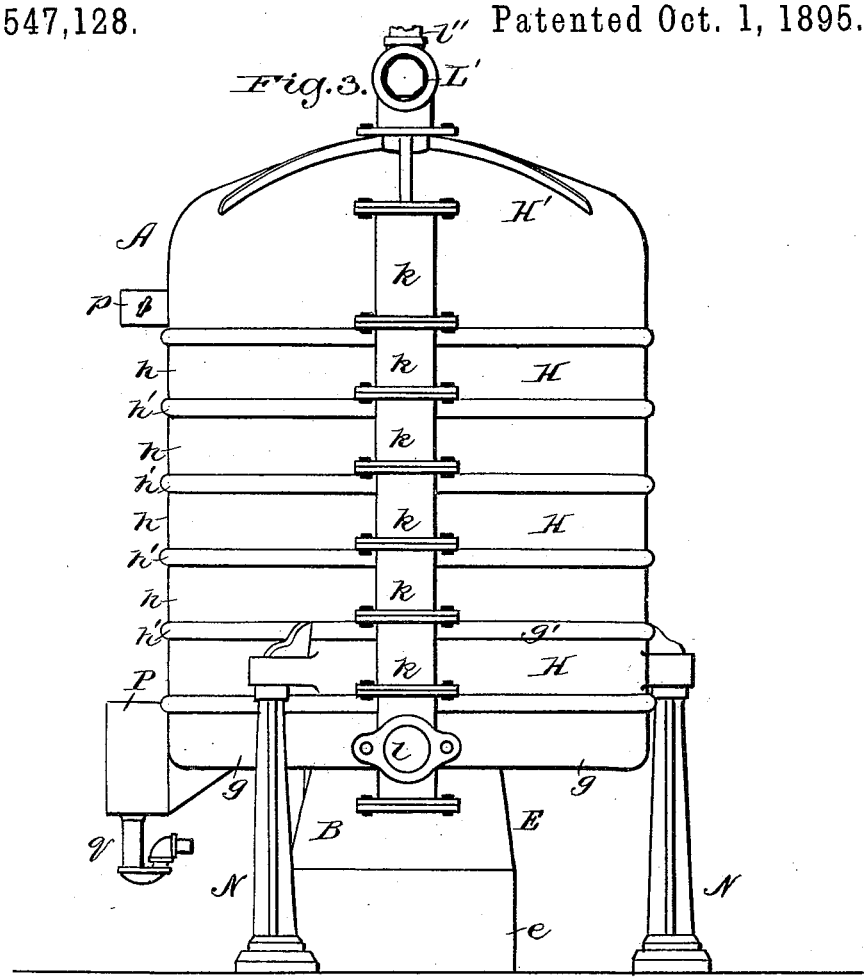
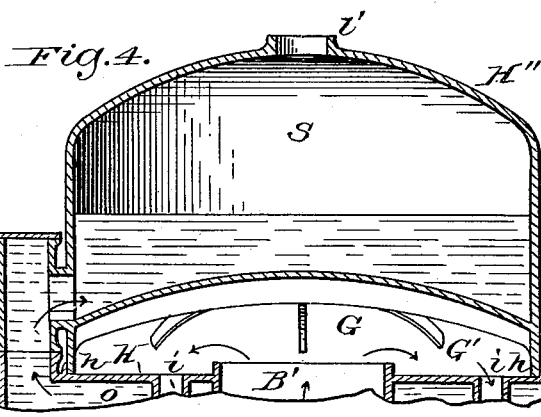
Witnesses
Inventors
Hawley Pettibone &
Burdett Loomis Jr.
By E. B. Clark
Attorney

UNITED STATES PATENT OFFICE.

HAWLEY PETTIBONE AND BURDETT LOOMIS, JR., OF HARTFORD, CONNECTICUT.

DOMESTIC WATER AND STEAM HEATER.

SPECIFICATION forming part of Letters Patent No. 547,128, dated October 1, 1895.

Application filed March 7, 1895. Serial No. 540,823. (No model.)

*To all whom it may concern:*

Be it known that we, HAWLEY PETTIBONE and BURDETT LOOMIS, Jr., citizens of the United States, residing at Hartford, in the county of Hartford and State of Connecticut, have invented certain new and useful Improvements in Domestic Water and Steam Heaters; and we do hereby declare the following to be a full, clear, and exact description of the invention, such as will enable others skilled in the art to which it appertains to make and use the same.

This invention relates to domestic gas-fired heaters adapted particularly for heating water and generating steam for use in hot-water and steam-circulating heating systems for warming buildings.

The object of our invention is to provide an improved construction of furnace adapted particularly for causing perfect combustion of gas, a good draft, and circulation of the hot gaseous products, and effective utilization of both the sensible and latent heat in such products. In order to secure these results we so construct the furnace as to produce and maintain a tall central column of issuing flame and hot products and numerous descending currents of such hot products in contact with the water to be heated, so as to cause condensation of the watery vapor in said descending products by the in and upward flowing currents of cold water to be heated. The products of combustion which are partially condensed within the heater are passed directly to the outer air at or near the base of the furnace. A large percentage of the moisture or steam contained in the descending products are condensed, thereby creating a partial vacuum, which assists circulation and the draft of the furnace.

Another object of our invention is to provide a more convenient and effective construction of the water-heating and circulating chambers or compartments of the heater.

The matter constituting our invention will be particularly set forth in the claims.

The details of construction of our improved furnace are illustrated in the accompanying drawings, in which—

Figure 1:
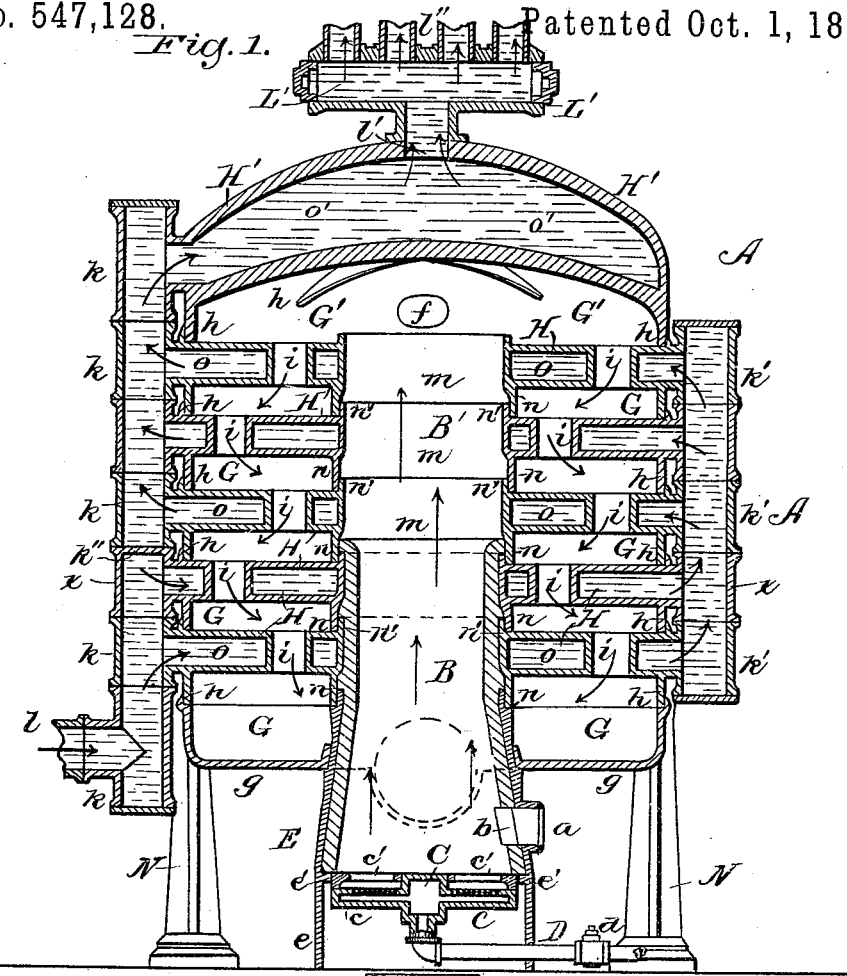
Figure 2:
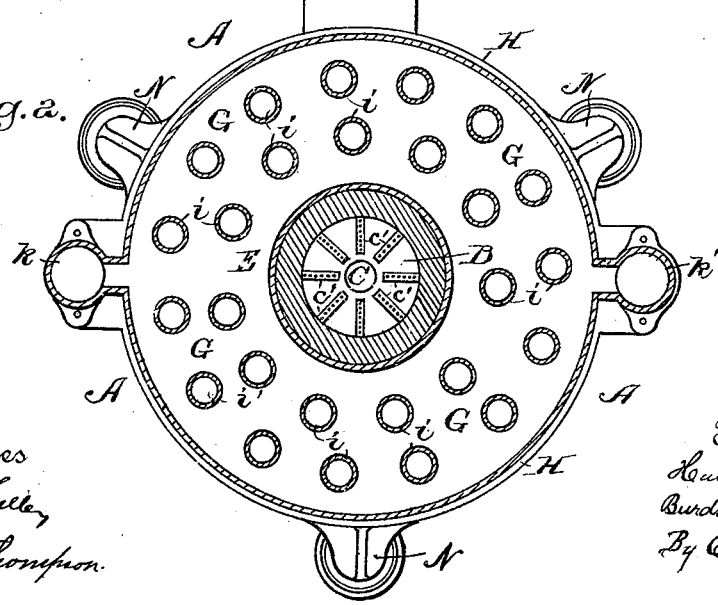

Figure 1 represents a vertical section of the heater. Fig. 2 represents a horizontal section thereof on the line $x$ $x$, Fig. 1. Fig. 3 represents a side elevation. Fig. 4 represents a vertical section of the upper part of the furnace, showing a steam-dome.

The furnace or heater A is constructed with a central vertical combustion-chamber B, inclosed by an iron jacket E, having a downward extension $e$ resting upon the floor or foundation. A central extension-flue B' is provided for the combustion-chamber by means of the interior walls of the superimposed water chambers or compartments, as shown in Fig. 1. The jacket E is provided with a lining of fire-brick, which may extend to any desired height in the central flue, and such fire-brick rests at its lower end upon the inwardly-projecting flange $e'$. The combustion-chamber is provided above the burner with a lighting opening $b$, closed by door $a$. The burner C is made of suitable dimensions to completely fill and close the bottom of the combustion-chamber and fits up close against the lower end of the fire-brick lining, as shown in Fig. 1. The burner may be of any suitable construction and, as shown, is provided with radial perforated arms $c$, and a top plate having radial slots $c'$ just above the perforated arms, so that the inflowing air will be mixed with the issuing jets of gas and cause perfect combustion. A gas-supply pipe D having a valve $d$ connects with the under side of the burner C. The central chamber B and its extension-flue B' are surrounded by chamber G for outgoing hot products, and such chamber is closed at the bottom by a dish-shaped bottom plate $g$, having a central opening and resting upon a ledge or flange of the iron jacket E. The water chambers or compartments H superimposed one above the other are also supported centrally by means of their internal flanges upon the iron jacket E. The interior walls and flanges of the water-chambers H form the extension-flue B', (shown in Fig. 1,) and the exterior walls and flanges of said chambers form the outer wall of the heater, as shown in Fig. 3. The hollow water-chambers H are made of flat circular form, and are superimposed one above the other and supported at their circumferential portions upon the legs N. They are constructed with large central openings $m$, the walls of which are formed with downwardly-extending spacing-flanges $n$ and short upwardly-extending flanges $n'$, as shown in Fig. 1. The outer circumferential walls of chamber H are constructed with downwardly-extending spacing-flanges $h$ and short upwardly-extending embracing-flanges $h'$, as shown in Fig. 3. The downwardly-extending flanges $h$ and $n$ suitably space the chambers apart, so as to form spaces G for hot products between said chambers, and the short flanges $h'$ and $n'$ embrace and support the downward flanges for holding the superimposed chambers in place. The chambers H are also constructed with short vertical flues or passages $i$, and the chambers are so set one above another that such flues $i$ will not register with one another, but will form zigzag passages for the descending hot products of combustion, as clearly shown in Fig. 1.

At suitable points, and at preferably opposite points in the circumferential portions of the chambers, are constructed the vertical inlet and outlet water-passages $k$ and $k'$, connecting the water-spaces $o$ of the chambers in vertical series. The vertical inlet-passage $k$ of the second chamber H from below upward is provided with a transverse partition-plate $k''$ for directing the inflowing water first through the two lower chambers from left to right, as indicated by the arrows, to the connecting-passages $k'$, from which the water flows from right to left through the three chambers H above, and thence from the passages $k$ into the dome-chamber H'. A water-supply pipe $l$ connects with the lowermost inlet-passage $k$. An outlet-pipe $l'$ connects the top of the dome H' with the horizontal water-pipe L', with which connects the circulating-pipes $l''$. The dome-chamber H' is preferably constructed with arched top and bottom plates, as shown, and forms an upper chamber G' for receiving and distributing products of combustion as they rise from the central flue B'. A horizontal escape-pipe $f$, having a damper $p$, leads out from chamber G' for escape of products when first starting the operation of heating up the furnace. A short escape-flue P connects with the lower end of the smoke-chamber G for connecting therewith a pipe for conducting off waste gases, if desired. A bent seal-pipe $q$ is attached to the under side of smoke-flue P for conducting off water of condensation.

When it is desired to generate and circulate steam instead of water for warming the building, an enlarged dome H'', having a steam-space S above the water-level, is set on top of the heater, as shown in Fig. 4.

The water chambers or compartments H, with their internal and external flanges, smoke-passages, and the lateral water-passages are preferably each cast in one piece, and after having been placed in position one above the other they are secured together by the lateral flanges and bolts of the water-passages $k$ and $k'$, as shown in Fig. 3.

Having described our invention, what we claim, and desire to secure by Letters Patent, is—

1. The combination with a central combustion chamber and fire-box, of a series of water heating chambers or compartments, superimposed one above the other, and constructed with large central openings connecting with said combustion chamber for the ascending currents of flame and hot products and each with a series of small return openings arranged to break joints one with another and form zigzag passages for the descending currents of hot products, said chambers also being provided with lateral water passages abutting one against the other, and the inlet passage $k$ upon one side having a transverse partition plate $k''$, for directing the inflowing water through the lower chambers from one side to the other, substantially as described.

2. In a domestic water and steam heater, the combination of a series of flat water heating chambers or compartments superimposed one above the other and constructed with large central openings, the walls of which are provided with downward and upwardly extending vertical flanges, and with circumferential downwardly extending spacing flanges and upwardly extending embracing and supporting flanges forming the exterior wall of the heater, said chambers also being provided with lateral vertical water passages abutting one against the other to form inlet and outlet connecting passages and also each having a series of small smoke passages, arranged to break joints one with another and form zigzag return flues for the downwardly flowing products of combustion, and an escape flue connecting with the shell below said return flues substantially as described.

3. In combination with a central combustion chamber and fire box and an extension flue above the same, of a series of superimposed flat water heating chambers having large central openings, the walls of which are provided with downward and upward extending flanges for spacing said chambers apart and forming the central combustion chamber and extension flue; also provided with circumferential downward and upward extending flanges embracing one another and forming the exterior wall of the heater, said chambers also being provided with lateral vertical water passages abutting one against the other and connected together by lateral flanges and bolts, said chambers also being provided with series of vertical smoke passages set to break joint one with another and form zigzag passages for the downwardly flowing products of combustion, and a dome water chamber extending over the central combustion chamber and having an escape pipe or opening for water or steam, substantially as described.

4. In a domestic water and steam heater, the combination of a series of flat water heating chambers or compartments superimposed one above another and constructed with large openings, arranged in vertical alignment, one above another for the ascending currents of flame and hot products and with a series of small openings arranged to break joints one with another and form zigzag passages, for the descending currents of hot products, a combustion chamber connecting with the large openings and an escape flue connecting with the small openings of said water chambers, substantially as described.

In testimony whereof we affix our signatures in presence of two witnesses.

HAWLEY PETTIBONE.
    BURDETT LOOMIS, Jr.

Witnesses:
 W. H. H. YOUNG,
 E. B. CLARK.